US012243508B1

(12) United States Patent
Jain

(10) Patent No.: US 12,243,508 B1
(45) Date of Patent: Mar. 4, 2025

(54) EAR MICROPHONE SIGNAL ESTIMATOR AND/OR PROJECTION FILTER GENERATOR FOR ROAD NOISE CANCELATION (RNC) SYSTEM

(71) Applicant: Bose Corporation, Framingham, MA (US)

(72) Inventor: Ankita Deepak Jain, New York, NY (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/783,984

(22) Filed: Jul. 25, 2024

(51) Int. Cl.

| | |
|---|---|
| ***G10K 11/178*** | (2006.01) |
| ***H04R 1/08*** | (2006.01) |
| ***H04R 1/40*** | (2006.01) |
| ***H04R 3/00*** | (2006.01) |

(52) U.S. Cl.
CPC .... *G10K 11/17857* (2018.01); *G10K 11/1783* (2018.01); *H04R 1/08* (2013.01); *H04R 1/406* (2013.01); *H04R 3/005* (2013.01); *G10K 2210/12821* (2013.01); *G10K 2210/3035* (2013.01); *G10K 2210/501* (2013.01); *H04R 2410/05* (2013.01); *H04R 2499/13* (2013.01)

(58) Field of Classification Search
None
See application file for complete search history.

(56) References Cited

U.S. PATENT DOCUMENTS 10,629,183 B2 4/2020 Torres et al.
2020/0074976 A1* 3/2020 Torres .............. G10K 11/17853
2020/0312344 A1* 10/2020 Hera ........................ G10L 15/20
2022/0208168 A1* 6/2022 Aval ................. G10K 11/17815
2023/0097755 A1* 3/2023 Seneger ............. G10K 11/1783 381/71.4
2023/0197048 A1* 6/2023 Farahanisamani ........................... G10K 11/17881 381/71.4
2023/0252967 A1* 8/2023 Feng ................ G10K 11/17817 381/71.4
2023/0298558 A1* 9/2023 Lu .................... G10K 11/17854 381/71.6

* cited by examiner

*Primary Examiner* — Qin Zhu
(74) *Attorney, Agent, or Firm* — Hoffman Warnick LLC

(57) ABSTRACT

Various implementations include a method of training a road noise cancelation (RNC) system for a vehicle, including: providing inputs to RNC system, the inputs obtained from: a set of ear-mounted microphones on a user, at least one transducer, an accelerometer, a set of cabin microphones in the vehicle, and a controller area network (CAN) bus, the inputs from the set of ear-mounted microphones on the user approximating a signal detected by the ears of the user; adapting a set of parameters in the RNC system defining an estimated signal detected at respective ears of the user based on the inputs; and generating at least one of the following for input during an operating mode of the RNC system: estimated ear microphone signals based on the adapted set of parameters, or a set of projection filters for use in determining an estimated ear signal at the respective ears of the user.

23 Claims, 8 Drawing Sheets

EAR MICROPHONE SIGNAL ESTIMATOR AND/OR PROJECTION FILTER GENERATOR FOR ROAD NOISE CANCELATION (RNC) SYSTEM

TECHNICAL FIELD

This disclosure generally relates to audio systems. More particularly, the disclosure relates to road noise cancelation in a vehicle.

BACKGROUND

Conventional road noise cancelation (RNC) systems can fail to adequately mitigate noise for vehicle occupants. Certain of these conventional systems aim to minimize an error signal that represents undesired sound at a remote location, e.g., at a user's ear location. While these conventional systems provide various benefits, they may fail to accurately account for actual road noise detected by a user.

SUMMARY

All examples and features mentioned below can be combined in any technically possible way.

Various implementations include audio systems and related approaches for providing road noise cancelation (RNC).

In some particular aspects, a method of training a road noise cancelation (RNC) system for a vehicle includes: providing inputs to a RNC system, the inputs obtained from: a set of ear-mounted microphones on a user of the vehicle, at least one transducer, an accelerometer, a set of cabin microphones in the vehicle, and a controller area network (CAN) bus, where the inputs from the set of ear-mounted microphones on the user approximate a signal detected by the ears of the user; adapting a set of parameters in the RNC system defining an estimated signal detected at respective ears of the user based on the inputs; and generating at least one of the following for input during an operating mode of the RNC system: estimated ear microphone signals based on the adapted set of parameters, or a set of projection filters for use in determining an estimated ear signal at the respective ears of the user.

In additional particular aspects, a method of running a road noise cancelation (RNC) system for a vehicle includes: providing inputs to the RNC system, the inputs obtained from: at least one transducer, an accelerometer, a set of cabin microphones in the vehicle, and a controller area network (CAN) bus, applying a set of parameters in the RNC system defining an estimated signal detected at respective ears of a user based on the inputs, wherein the set of parameters are applied based on at least one of: estimated ear microphone signals, or a set of projection filters for use in determining an estimated ear signal at the respective ears of the user; and generating noise cancelation signals for output by the at least one transducer based on the applied set of parameters.

In other particular aspects, a system includes: a vehicle audio system including at least one transducer for providing an audio output to a user in a vehicle; a vehicle sensor system for obtaining sensor inputs about the vehicle; and a road noise cancelation (RNC) system connected with the vehicle audio system and the vehicle sensor system, the RNC system including a machine learning (ML) module and an adaptive module, where the ML module is configured to: receive inputs from: the vehicle audio system and the vehicle sensor system; apply a set of parameters defining an estimated signal detected at respective ears of the user based on the inputs, where the set of parameters are applied based on at least one of: estimated ear microphone signals, or a set of projection filters for use in determining an estimated ear signal at the respective ears of the user, and where the linear adaptive (LA) module is configured to: generate noise cancelation signals for output by the at least one transducer based on the applied set of parameters.

Implementations may include one of the following features, or any combination thereof.

In some cases, the ear-mounted microphones only provide inputs during the training.

In certain aspects, the ear-mounted microphones are located proximate an ear canal entrance of the user.

In some examples, cabin microphones are located on or near a roof or headliner of the vehicle, on or near a door of the vehicle, on or near a panel of the vehicle, on or near a windshield of the vehicle, on or near a seat in the vehicle (e.g., a seatback or headrest), in the trunk of the vehicle, in the footrest region of the vehicle, or anywhere inside the cabin cavity.

In particular cases, the inputs from the set of ear-mounted microphones on the user represent at least one of road noise as detected by the user at each ear, or a cancelation signal output by the at least one transducer, or a combination there of.

In some examples, the ear-mounted microphones are located near, or proximate the ear canal entrance of each ear, e.g., near the pinna of the ear. In certain examples, the ear-mounted microphones are located in, or otherwise contact, the ear canal entrance.

In some implementations, the at least one transducer is a near-field (NF) transducer proximate a passenger of the vehicle. In some examples, a plurality of NF transducers are located proximate the passenger of the vehicle, a number of which can be used to control (e.g., mitigate) detected road noise.

In certain cases, the set of projection filters includes a matrix of projection filters estimating a relationship between at least two of: a plurality of positions of the user's respective ears, a position of the at least one transducer, and a position of the set of microphones in the cabin of the vehicle (in some examples, proximate the roof of the vehicle or elsewhere in the cabin cavity).

In particular aspects, the set of projection filters are defined at least in part based on the inputs obtained from the set of ear-mounted microphones.

In some cases, the method further includes adjusting fixed parameters in a linear adaptive module of the RNC system based on the estimated ear microphone signals.

In certain cases, the inputs from the CAN bus include at least one vehicle input including: revolutions per minute (RPM) of the drive system, speed, torque, throttle, braking, positioning (e.g., global positioning system, GPS), steering angle, temperature (e.g., vehicle cabin temperature, drive system temperature, and/or ambient temperature), pressure (e.g., ambient pressure and/or tire pressure), seat position, user position, or seat occupancy.

In some examples, the method further includes updating the RNC system based on the generated estimated ear microphone signals and/or the set of projection filters during the training.

In certain cases, the RNC system includes a machine-learning (ML) module with a set of non-linear pathways defined as sequences of steps between distinct sets of parameters, where steps between the distinct sets of parameters are alterable during the training.

In some examples, the model includes hundreds of thousands of parameters, for example, at least two-hundred thousand, at least three-hundred thousand, or at least four-hundred thousand parameters.

In some implementations, after the training, the steps between the distinct sets of parameters are fixed. In certain examples, the steps can be subsequently altered during re-training.

In certain examples, in an operation mode where steps between distinct sets of parameters are fixed, noise cancelation signals are deterministic of input signals result based on the fixed sets of parameters. In such cases, common acoustic signals result in common noise cancelation signals for output based on the fixed sets of parameters.

In particular aspects, common input signals result in distinct noise cancelation signals for output based on changes in parameters during the training.

In some cases, during the training, each parameter is updated at every step based on the inputs.

In certain implementations, updating of each parameter is based on a derivative of an error or loss function detected for each parameter.

In various implementations, the ML module is trained using inputs from user-worn input microphones that approximate road noise detected by a user's ears.

In particular cases, inputs to the system are received from the at least one transducer and the sensor system, the inputs from the sensor system including inputs from: an accelerometer, a set of cabin microphones in the vehicle, and a controller area network (CAN) bus.

In certain examples, the RNC system is configured to run in a plurality of modes.

In some aspects, the plurality of modes includes a training mode and an operational mode, and in the training mode the ML module is trained using inputs from user-worn input microphones that approximate road noise detected by a user's ears.

In certain cases, the ML module has at least one distinction in a set of parameters in the training mode as compared with the set of parameters in the operation mode.

In particular examples, the ML module is configured to be updated based on the generated road noise cancelation signals.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
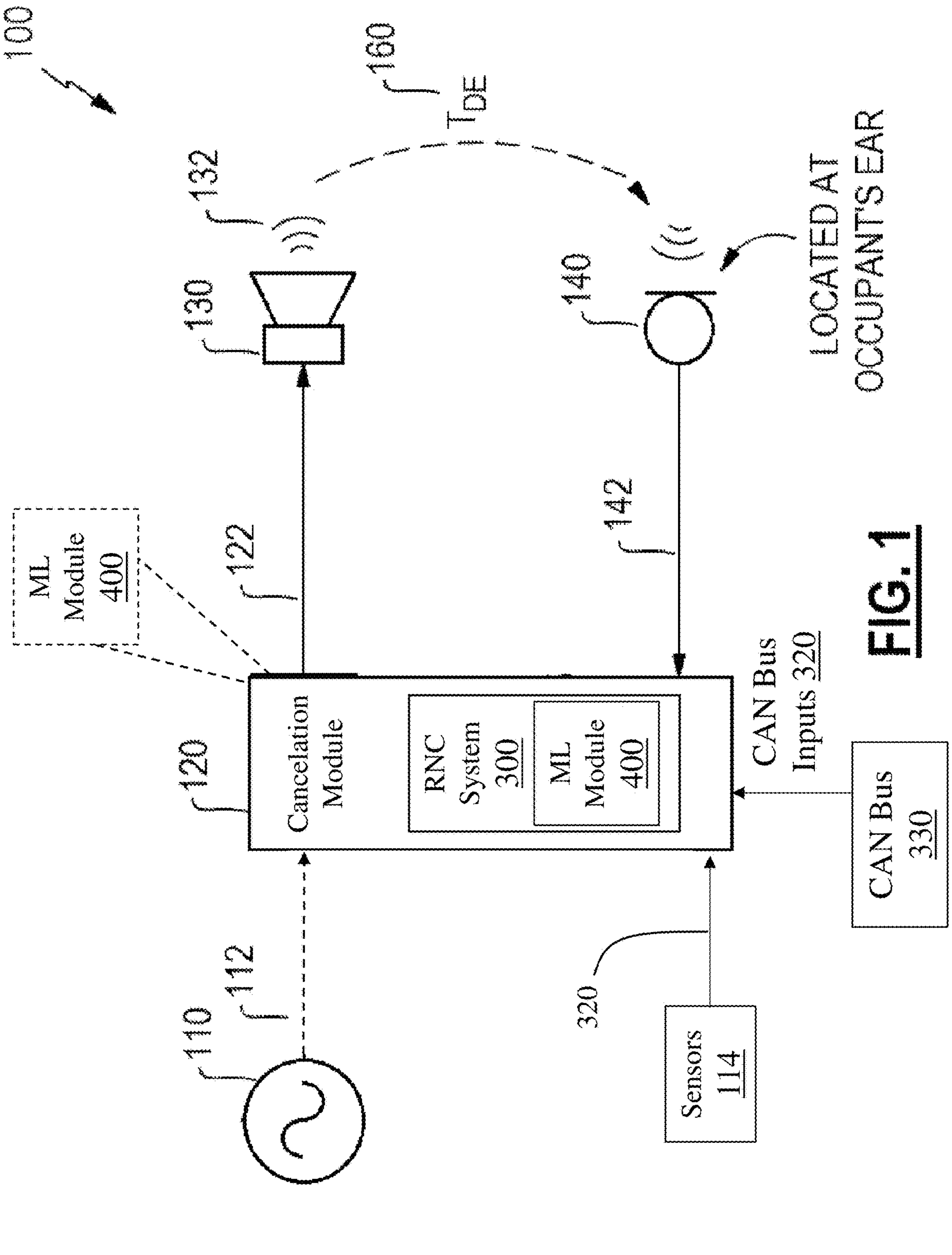
FIG. 1 is a schematic depiction of a sound cancelation system according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a road noise cancelation (RNC) system for a vehicle can be trained to accurately generate noise cancelation signals, enhancing user experience(s). The approaches and systems described herein can utilize a machine learning (ML) module that is trained using inputs from ear-mounted microphones. The ML module adapts a set of parameters that define an estimated signal detected at a user's ears based on inputs. The parameters are used to generate estimated ear microphone signals and/or a set of projection filters during operation of the RNC system. In certain cases, during operation of the RNC system, the set of parameters is applied to estimate a signal detected at respective ears of the user, and noise cancelation signals are generated based on the applied set of parameters.

Commonly labeled components in the FIGURES are considered to be substantially equivalent components for the purposes of illustration, and redundant discussion of those components is omitted for clarity.

Sound cancelation systems that cancel or reduce undesired sounds in a predefined volume, such as road noise cancelation in a vehicle cabin, often employ a feedback sensor (such as a microphone) to generate an ear (or, error) signal (or feedback signal) representative of residual uncanceled sounds. This ear signal is fed back to an adaptive filter that adjusts a cancelation signal in an attempt to minimize the residual uncanceled sound.

However, in some contexts, the feedback sensor may not be positioned at an optimal location. For example, in the vehicle context, the feedback sensor may be placed in the roof, pillar, or headrest, but the undesired sound should be canceled at a passenger's ears. As a result, the ear (or, error) signal is indicative of the error at the feedback sensor, but not at the passenger's ears. This is undesirable because the objective of the cancelation system is to cancel undesired sounds at the passenger's ears. Placing microphones on passenger's ears, however, is impractical and likely unacceptable to the passenger. In some examples, however, a priori measurements by a microphone placed at an ear location may determine an acoustic relationship between the ear location and the feedback sensor location. Accordingly, the feedback sensor signal (e.g., a cabin mic) may be 'projected' to an equivalent ear mic signal. Alternatively stated, a cabin (e.g., roof, seatback/headrest, panel, dashboard, windshield, etc.) mic signal may be filtered (based upon the acoustic relationship between the two locations) to provide a virtual ear mic signal. In various examples, the acoustic relationship between the feedback sensor location and the passenger ear location may vary depending upon vehicle and cabin conditions as described herein, such that the filter may be selected based upon such vehicle and/or cabin conditions.

In addition, sound canceling audio signals—in the vehicle and other contexts—are typically delayed approximately three-five milliseconds, as the audio signal must travel from a speaker disposed along the perimeter of the vehicle cabin to the passenger's ears (e.g., the canceling audio signal must travel from approximately five feet away from the passenger's ear, and the speed of sound is approximately one foot per millisecond). This delay prevents optimal canceling because the canceling audio signal, as perceived by the passenger is directed toward sound that has already occurred. Accordingly, some examples may include features to predict future values of the residual sound at the occupant's ear without placing a microphone at the occupant's ear. Further details of predicting sound or residual sound may be found in U.S. Pat. No. 10,629,183 issued on Apr. 21, 2020, titled SYSTEMS AND METHODS FOR NOISE-CANCELATION USING MICROPHONE PROJECTION, which is incorporated herein in its entirety for all purposes.

Various examples disclosed herein include a cancelation system that estimates an ear (or, error) signal representative of residual uncanceled sound at a location remote from the feedback sensor. The estimation, in an example, is based on available information from, namely, remote reference microphones, and from knowledge of the relationship between those remote microphones and the sound field at the passenger's ears and of the output of the sound cancelation system itself. The resulting adjustment to the adaptive filter, based on the estimated ear signal, will minimize the estimated ear signal and thus cancel the undesired sound at the remote location rather than at the feedback sensor, e.g., effectively projecting the feedback sensor to the remote location. This may alternately be understood as shifting the cancelation zone from the feedback sensor to the location remote from the feedback sensor.

In particular cases, disclosed embodiments include a cancelation system such as a road noise cancelation (RNC) system that includes a machine-learning (ML) module (or, component). The ML module is configured to function in a training mode and an operation (or operating) mode. In the training mode, inputs from ear-mounted microphones are provided to the ML module to aid in adapting a set of parameters that define noise cancelation signals. The ear-mounted microphones can be located proximate an ear canal entrance of the training user, providing signals that approximate detected road noise by the user's ears. In particular cases, the ear-mounted microphone inputs are only used during the training mode. In particular cases, the ML module is configured to be updated based on generated road noise cancelation signals. In certain aspects, the ML module is fixed after the training, and is configured to provide an input to an operational RNC system, which can include one or more adaptive systems, e.g., a linear adaptive (LA) RNC system, e.g., an engine harmonic cancellation (EHC) RNC system, an engine harmonic enhancement EHE RNC system or an active sound management ASM RNC system.

FIG. 1 is a schematic diagram and/or signal flow diagram of an example sound cancelation system 100 that includes a signal source 110, a cancelation module 120, a transducer 130 (e.g., loudspeaker or driver), and a microphone 140 (feedback sensor). In particular implementations, the cancelation module 120 includes an adaptation module, which as described herein, includes a road noise cancelation system. While certain implementations and systems are described as including a road noise cancelation (RNC) component, or are otherwise configured to cancel road noise, it is understood that sound cancelation system 100 and other systems herein can be configured to cancel noise from any number of sources to enhance the user experience in a space, e.g., a vehicle.

Returning to FIG. 1, in various examples, the RNC system 100 can include a road noise cancelation component that is configured to cancel road noise, and in some optional additional implementations, engine harmonic noise. As noted herein, in some cases, the (e.g., road) noise cancelation system 100 may be configured to reduce the audible noise detected from the interaction of the vehicle with the road, as well as other ambient noise detectable by the user. In particular implementations, a signal source input 310 is configured to provide inputs relating to road noise to cancelation module 120, e.g., as detected by sensors 114. As described herein, additional inputs (e.g., inputs 320 from a CAN Bus 330) relating to road noise can be used to train and/or operate a ML system (e.g., a ML component including one or more ML neural networks) in characterizing the signal source to the RNC system 100.

In certain optional cases, a signal source 110 may be provided, which can include a signal generator that provides a reference signal 112 that may include components representative of harmonics of rotating equipment associated with the environment. For example, in a vehicle, the drivetrain, e.g., engine, transmission, transaxle, wheels, etc., may generate various harmonics that produce audible sound in the vehicle cabin. In some of these optional examples, the reference signal (e.g., reference signal 112) may include a number of sinusoidal signals at various frequencies representing one or more harmonics of the rotating equipment.

In various implementations, the cancelation module 120 receives the input 310 and filters the input signal 310 to produce a cancelation signal 122. The cancelation signal 122 is a driver signal that drives the transducer 130 to produce a cancelation audio signal 132 in the environment, e.g., in the cabin of a vehicle in some examples. The microphone 140 is a feedback sensor that detects sound in the environment and provides an ear signal 142. The cancelation module 120, including an adaptation module (e.g., RNC system) receives the input signal 310 and the ear signal 142 and updates the cancelation module 120 to minimize the ear signal 142. Accordingly, the adaptation module adjusts the cancelation module 120 such that sounds (e.g., road noise sounds) at the microphone 140 are reduced. As described herein, the cancelation module 120 and/can communicate with a machine learning (ML) component that aids in adjusting the cancelation signal 122 to the transducer 130.

Further, as noted herein, in optional implementations, the cancelation module 120 can be configured to receive the reference signal 112 and filter that reference signal 112 to produce (or contribute to) the cancelation signal 122. In certain examples, cancelation of engine harmonics can be performed in addition to, or as part of, road noise cancelation approaches.

In the example sound cancelation system 100 of FIG. 1, if the microphone 140 is ideally located at an occupant's ear, the system will effectively reduce or remove the sound of road noise at the occupant's ear. The cancelation audio signal 132 reaches the microphone 140 via a transfer function 160, TDE, which is a transfer function from the driver (location of the transducer 130) to the ear (location of the microphone 140). In various examples, the adaptation module may be programmed with an estimate of the transfer function 160 and may implement an adaptive algorithm, such as any of various least mean squares (LMS) or alternate algorithms, to adjust a transfer function, W, of the cancelation module 120 to minimize the ear signal 142.

Figure 2:
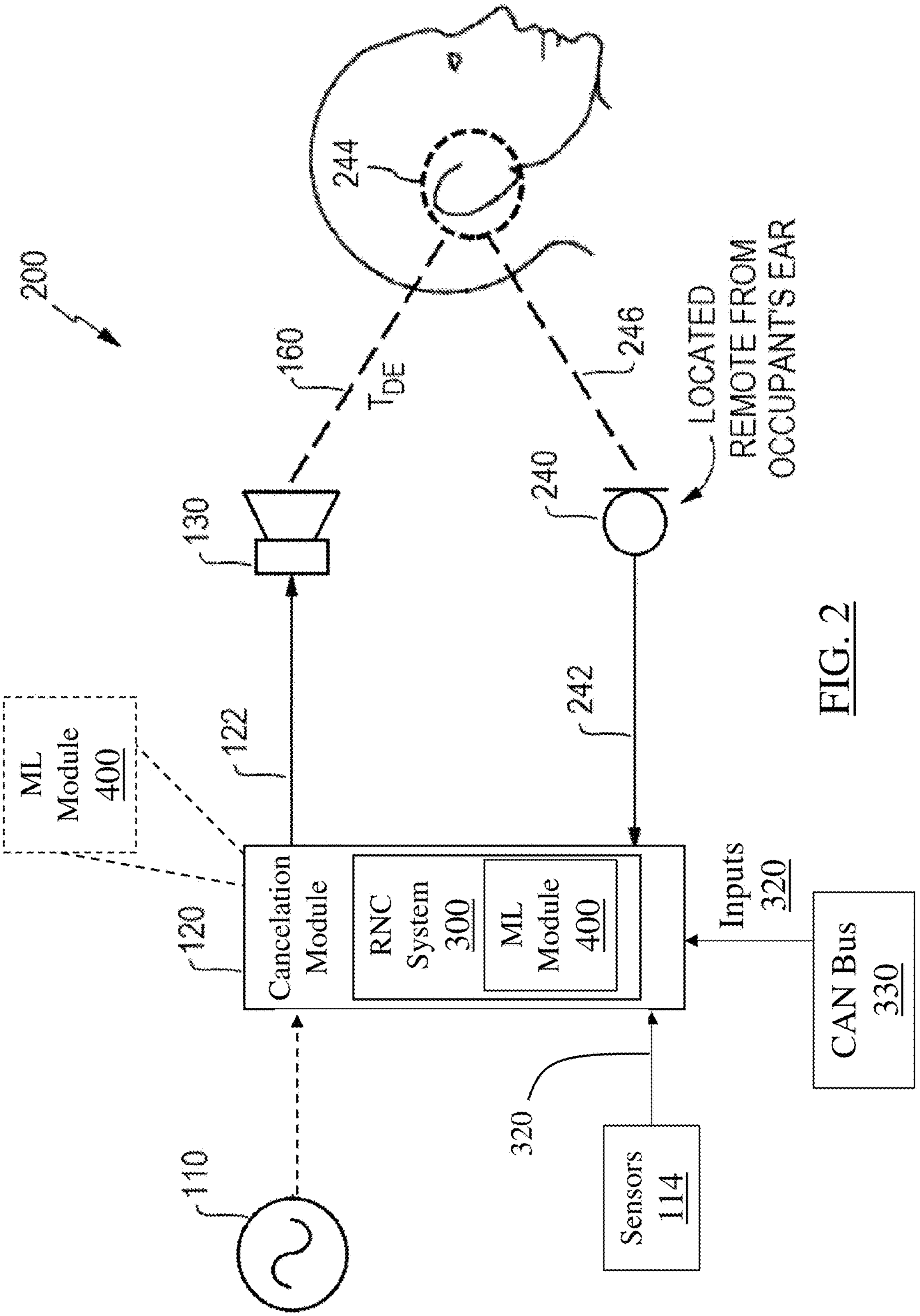
FIG. 2 is a schematic depiction of an additional sound cancelation system according to various implementations.
Figure 3:
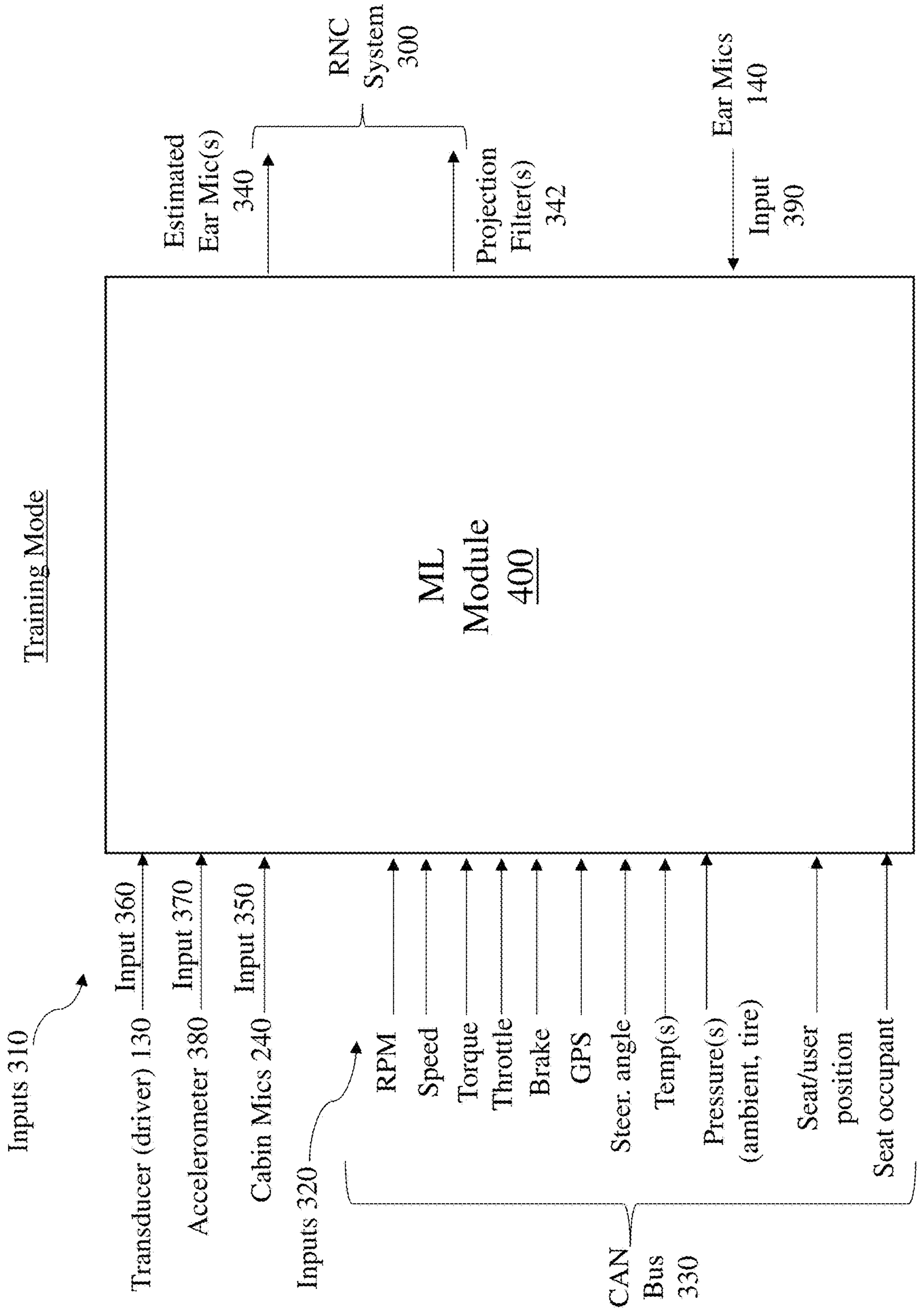
FIG. 3 is data flow diagram showing a machine learning (ML) module, in a training mode, according to various implementations.
Figure 4:
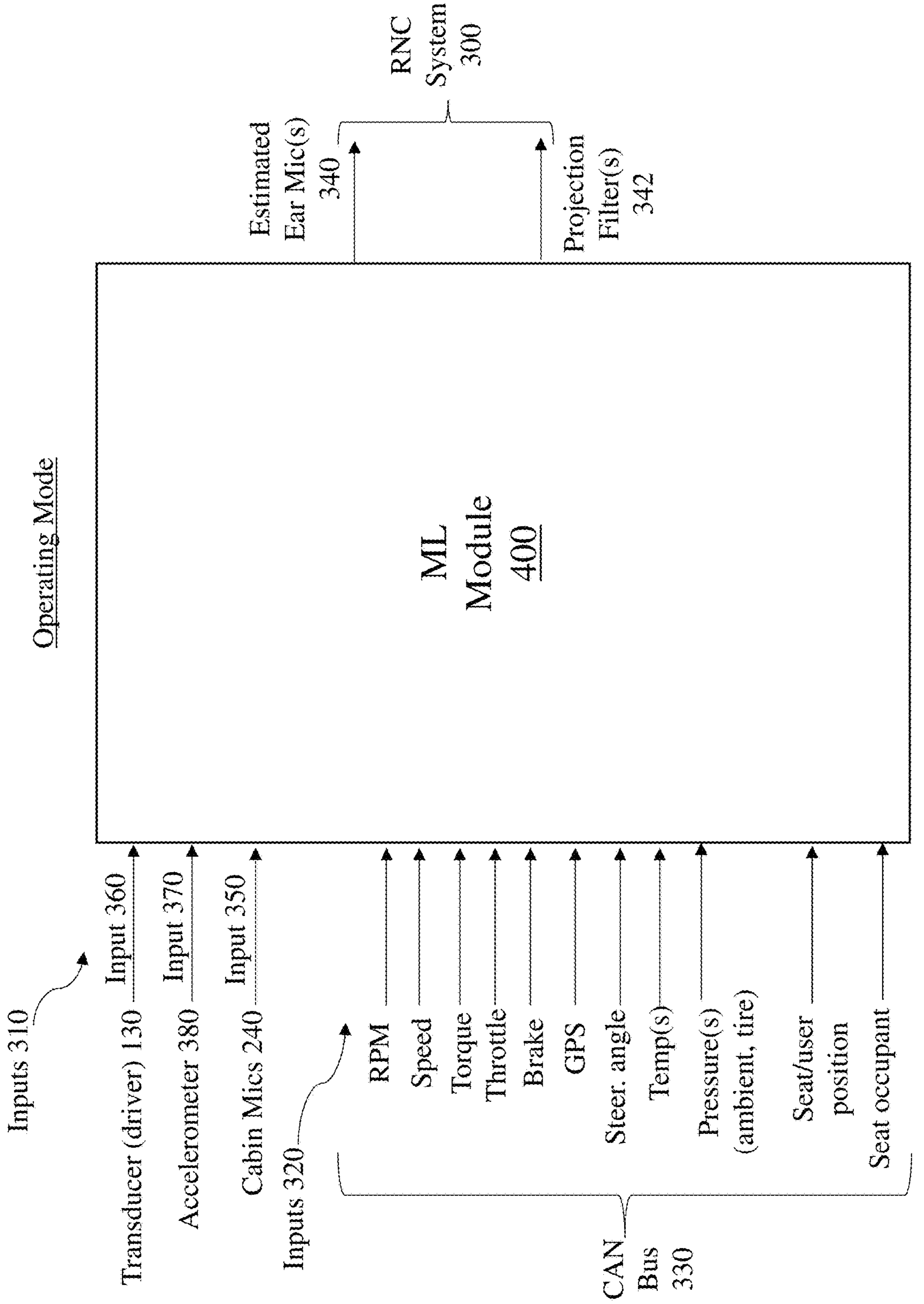
FIG. 4 is data flow diagram showing an ML module, in an operating mode, according to various implementations.

As noted herein and described with respect to FIGS. 2-4, the cancelation module 120 can include an RNC system (or component) 300 that is connected with a ML module 400 configured to be trained using various inputs and operate in the system 100 to generate cancelation signals according to implementations. In certain cases, at least a portion of the ML module 400 is part of the RNC system 300. It is understood that the ML module 400 can also function as a stand-alone module that is either upstream or downstream of the cancelation module 120 in the signal flow.

While the example sound cancelation system 100 of FIG. 1 contemplates the microphone 140 as an ear-mounted or ear-proximate microphone (e.g., located at or very near an occupant's ear), it may generally be unacceptable or impractical to place a microphone near an occupant's ear during operation, e.g., operation of a vehicle. In various examples, such a feedback microphone may instead be located in the cabin nearby but remote from an occupant's ear, such as at a portion of the roof, headliner, headrest or seatback, pillar, windshield, panel, in the trunk of the vehicle, in the footrest region of the vehicle, or elsewhere in the vehicle cabin cavity. In various implementations, as noted herein, the system 100 in FIG. 1 can be used to train the RNC system 300 and/or ML module 400 for subsequent use in an operation mode.

FIG. 2 illustrates another example sound cancelation system 200 that is similar to the sound cancelation system 100 except that the feedback sensor, microphone 240, is located remote from an occupant's ear 244. Accordingly, an ear signal 242 from the microphone 240 may not represent the undesired sound at the location of the occupant's ear 244. The sound cancelation system 200 of FIG. 2 operates in the same or similar manner to the sound cancelation system 100 of FIG. 1 and thereby may reduce the sound of road noise (and in some optional embodiments, harmonics) at the location of the microphone 240. In various implementations, the system 200 relies on the RNC system 300 to reduce the sound of road noise at the location of the user's ear 244.

In certain cases, system 200 can be used during operation of a vehicle, and can rely at least in part on the RNC system (also referred to as a component or module) 300 that is trained using inputs from ear-mounted microphones 140 (FIG. 1). In certain cases, the RNC system 300 is trained to detect relationships between sound at the location of microphone 240 and the sound at the location of the occupant's ear 244, and provide corresponding noise reduction signals for managing (e.g., mitigating) noise.

As described in U.S. patent application Ser. No. 17/611,280 ("Sound cancelation using microphone projection," US PG Pub. 2022/0208168, filed May 14, 2020, the entire contents of which are hereby incorporated by reference), sound at the location of the microphone 240 has a relationship 246 to sound at the location of the occupant's ear 244. The relationship 246 depends upon the source of sound and the manner in which the audible vibrations are transferred from the source and through the acoustics of the environment.

For example, in the non-limiting configuration where harmonic-based noise is considered, a particular harmonic, when operating at a particular frequency, may create a particular relationship 246, e.g., in terms of amplitude and phase, between the sound of the harmonic at the occupant's ear 244 and at the microphone 240. In various examples, a different harmonic may create a different relationship 246, even when operating at the same frequency (e.g., a first harmonic may create a certain frequency at a given RPM as a second harmonic does at a lower RPM) (e.g., a 100 Hz acoustic signal may be a first harmonic at one RPM and may be a second harmonic at another RPM). Further, in various examples, the relationship 246 may change with any of various operating conditions, such as torque, acceleration, vehicle loading, etc., as well as with acoustic properties of the environment, such as seat positions, window conditions, vehicle occupancy, loading aging, ambient temperature and/or pressure, etc.

In various examples, the relationship 246 is measured a priori for any number of noises of interest (to accommodate differing system goals) and under various conditions, and a projection filter is generated to filter the ear signal 242 to effectively account for or reverse the effect of the relationship 246 such that the filtered signal represents an estimate of the ear signal at the occupant's ear 244. According to various examples, the relationship 246 is measured for each noise across a range of frequencies (which in some cases, correspond with rotational rates of particular harmonics). The relationship 246 may then be equivalently modeled as a transfer function as a function of frequency, e.g., a set of phase and amplitude relationships across a range of frequencies for a given noise source. Accordingly, in various examples, the projection filter transfer function effectively projects the microphone 240 to the location of the occupant's ear 244, and may be referred to herein as WRE, because it relates the remote location (e.g., roof, seatback or headrest, windshield, panel, etc., location in some examples) to the ear location.

In addition to the vehicle powertrain operation and loading as described above, the relationship 246 for various noises (e.g., road noises and/or engine noise harmonics) and the transfer function 160 (secondary path) from transducer 130 to the occupant's ear 244 may vary as environmental (e.g., cabin and/or external environmental) acoustics change. Therefore, various examples of sound cancelation systems or algorithms herein may dynamically change (adjust, select) the projection filter transfer function and/or the correction filter transfer function based on changes in environmental conditions external to the cabin and/or cabin acoustics. In various examples, changes in cabin acoustics may be communicated via digital control signals, and for example may include window conditions open/closed (which and how much), sunroof condition open/closed (and how much), hatch door condition open/closed, rear seat condition (folded down, stowed, etc.), cargo/carrying load, and occupancy such as how many occupants are present in the cabin, in which seats, and how large are they, as well as others. For example, occupancy may be estimated by data from air-bag occupant sensors in the seats. In some examples, cameras, video, and/or facial recognition systems may also provide information about cabin conditions.

As noted herein, the relationship 246 may be equivalently considered as a transfer function between the two positions, e.g., the ear location (e.g., microphone 140) and the remote location (e.g., microphone 240), a transfer function being a phase and magnitude relationship across a range of frequencies, such as from an "input" to an "output." Accordingly, a filter having a related transfer function may account for the remote location of the microphone 240, e.g., such that the filter "projects" the microphone's signal to the ear location, e.g., as if the microphone 240 were located at the ear. In some examples, such a transfer function may be conceived as an actual transfer function for acoustic energy that arrives at a first of the locations and as it progresses to the second location. Such may hold true for audio coming from a given source and under specific operating conditions. For example, a 100 Hz first harmonic (k=1) coming from the engine may create a specific relationship 246, but a 100 Hz second harmonic (k=2) may create a different relationship. Likewise, a 100 Hz tone coming from a loudspeaker in the vehicle will likely create a much different relationship, as the source location of the tone and its transmission to the two locations will be vastly different from the 100 Hz first engine harmonic.

In various examples, multiple measurements may be made for each harmonic, k, and at each rotational rate, and an average phase and amplitude relationship may be used for a given harmonic and rotational rate. Additionally, and as presented in greater detail below, a relationship 246 for a given harmonic and rotational rate may depend upon further parameters, such as torque, loading, window positions, etc. In various examples, multiple measurements at varying torques (or other variations in operational parameters) may be made and an average phase and amplitude relationship may be used for a given harmonic and rotational rate under an "average" torque operating condition. For instance, in some examples, a number of measurements may be made across a range of positive torque conditions and an average of these is used when the vehicle is operated with positive torque. Likewise, in some examples, a number of measurements may be made across a range of negative torque conditions and an average of these is used when the vehicle is operated with negative torque. Additionally, some examples may include a number of measurements made across a number of substantially neutral torque conditions and an average of these is used when the vehicle is operated with substantially neutral torque.

Example tuning systems, e.g., as described in U.S. patent application Ser. No. 17/611,280 (US PG Pub. 2022/0208168, previously incorporated by reference) include a temporary configuration to make measurements to characterize the relationship 246 of various noise sources at various frequencies. Various examples of sound cancellation systems in accord with those described herein will not include a microphone 140 located at an occupant's ear. Various sound cancellation systems herein include one or more projection filters to each apply a transfer function to a remote microphone signal (e.g., from the microphone 240) with the purpose of estimating a signal that an ear microphone (e.g., microphone 140) would produce if it were present.

Some examples may include multiple remote microphones 240, such as for multiple locations in the vehicle. Further, some examples of a tuning system similar to that of FIG. 3 may include multiple remote microphones 240 and also may include multiple ear microphones 140, such as for each side of an occupant's head and/or for multiple occupants. Accordingly, a transfer function of a projection filter (a filter that receives remote microphone signals and estimates ear microphone signals) may be a matrix. In other examples, such a transfer function may be considered to be a plurality of projection filters, each "projecting" a remote microphone location to an ear microphone location.

As described in U.S. patent application Ser. No. 17/611,280, previously incorporated by reference, tuning approaches can be applied to measure one or more relationships 246 (WRE) between the microphone 240 and the location of the occupant's ear 244.

Additional environmental conditions can be measured using external sensors such as temperature, pressure, force, etc., sensors that detect conditions external to the cabin.

Various disclosed implementations can provide additional beneficial features in training and/or running (operating) an RNC system 300 (FIGS. 3 and 4). In certain implementations, the RNC system 300 can include an adaptive processing module that is configured to control the cancelation module 120. The adaptive processing module can include an adaptive filter that adjusts the cancelation signal 122 based on various inputs described herein.

As noted herein, in particular cases, the RNC system 300 communicates with a machine learning (ML) module 400 that is configured to adapt a set of parameters defining an estimated signal detected at a user's ears, and generate: i) estimated ear microphone signals based on the adapted set of parameters, and/or ii) a set of projection filters for use in determining an estimated ear (or, error) signal at the user's ears. In particular implementations, the ML module 400 is integrated with the RNC system 300, e.g., as a software module. In other cases, the ML module 400 is a separate component (including separate hardware and/or software) that communicates with the RNC system 300 (e.g., as illustrated in phantom in FIGS. 1 and 2). In particular cases, the RNC system 300 (and/or the ML module 400) can be trained with user-worn microphones (e.g., microphones 140, FIG. 1) to adapt parameters that are used during operation of the RNC system 300, e.g., in generating estimated ear microphone signals and/or projection filters.

In certain implementations, the ML module 400 provides projection filters and/or estimated ear microphone signals to the RNC system 300. In a particular example, the ML module 400 is separate from the RNC system 300 and is responsible for outputting, the estimated ear signals, the projection filters, or a combination of the two.

During training, the RNC system 300 can be run independently of the ML module 400, though this is not necessary in all implementations. The projection filters and/or estimated ear signals may or may not be fed into the RNC system 300.

In various implementations, the RNC system 300 uses true ear signals measured from mounted ear microphones 140 to compute its adaptive coefficients. In certain examples, to enforce stability constraints on the ML module 400, the projection filters or ear signal estimates (produced by the ML module 400) are fed (or otherwise provided) into the RNC system 300 during training.

During a prediction (or inference mode), which is also called an "operating" or "operational" mode of the ML module 400 herein, because there are no inputs from the ear microphones 140, the ML module 400 will predict either the projection filters or the estimated ear signals, those predictions are provided (or, fed) into the RNC system 300 to predict the adaptive coefficients.

Figure 5:
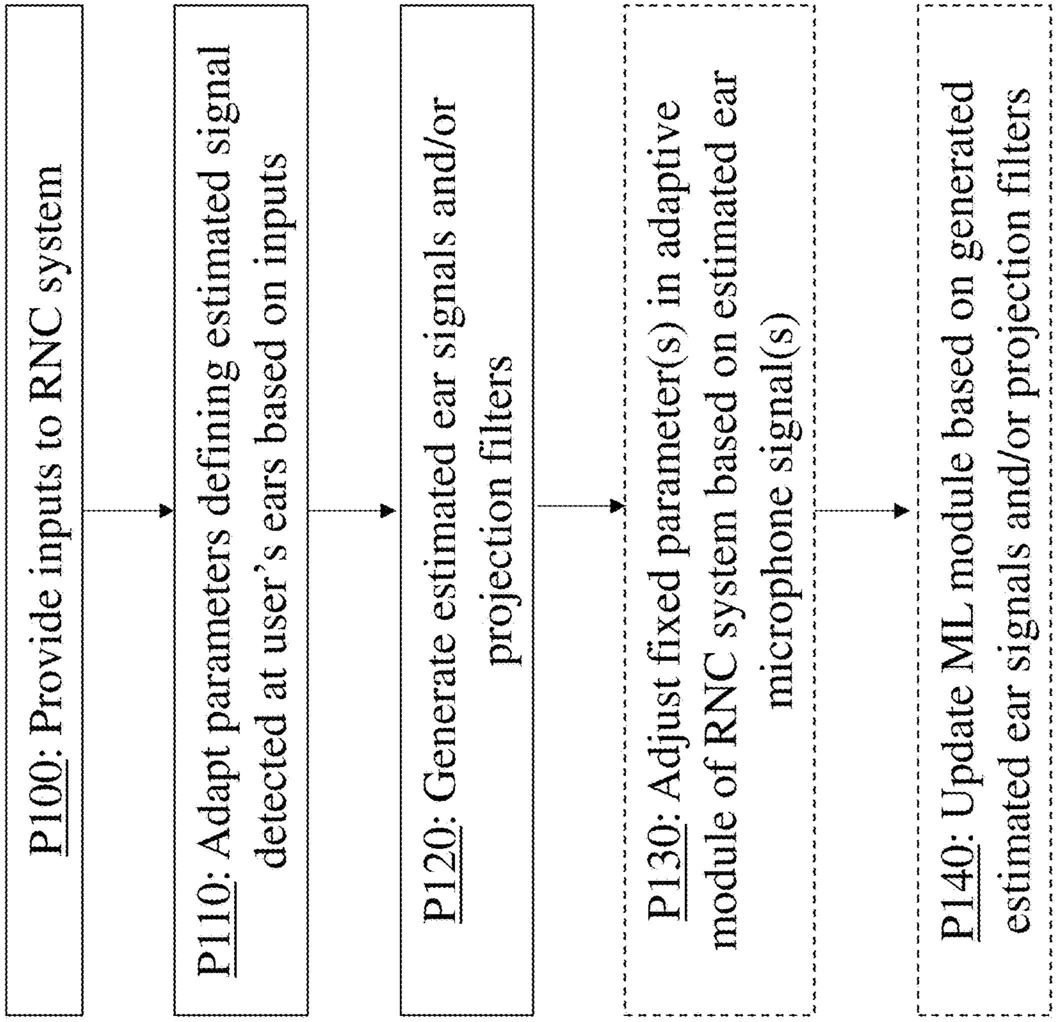
FIG. 5 is a flow diagram illustrating processes in training a road noise cancelation (RNC) system according to various implementations.
Figure 8:
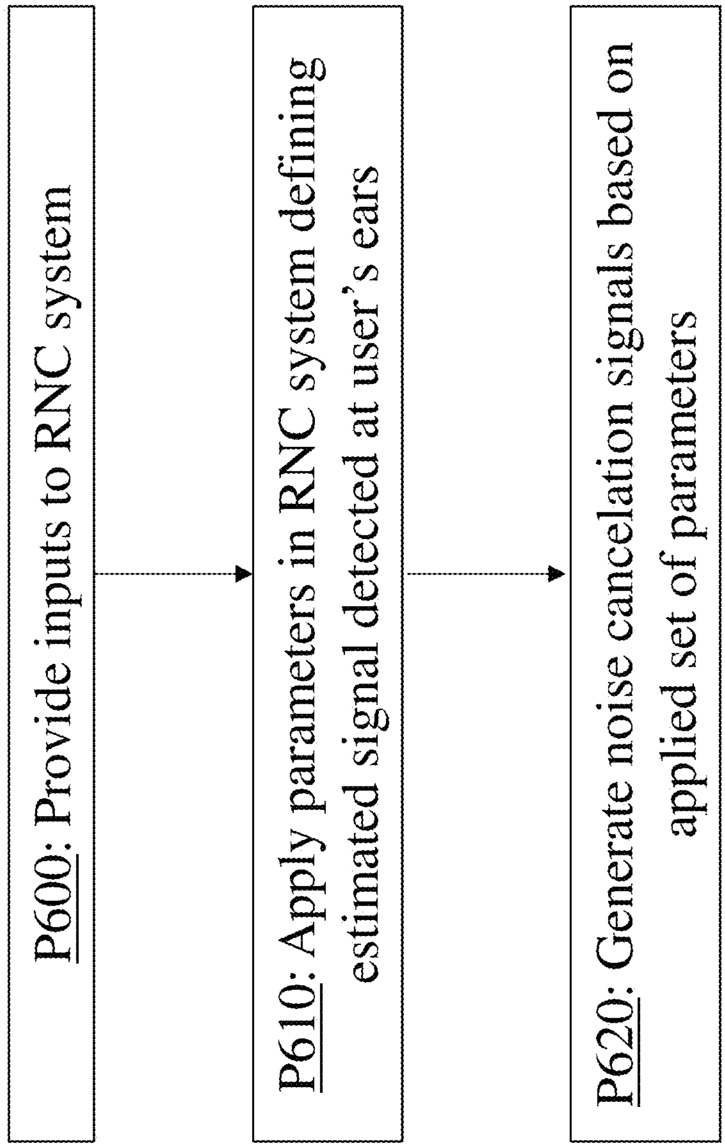
FIG. 8 is a flow diagram illustrating processes in operating an RNC system, according to various implementations.

FIG. 3 is a data flow diagram illustrating an ML module 400 in a training mode. FIG. 4 shows data flows for the ML module 400 in an operating mode. FIG. 5 shows a flow diagram illustrating processes in a method of training a ML module 400 for a vehicle. Referred to later herein, FIG. 8 shows a flow diagram illustrating processes in a method of running a RNC system 300 for a vehicle.

In particular cases, the ML module 400 includes an artificial intelligence engine that includes one or more neural networks, e.g., artificial neural networks (ANNs). In particular cases, the ML module 400 includes a model with a set of non-linear pathways defined as sequences of steps between distinct sets of parameters. As described herein, steps between the distinct sets of parameters are alterable during the training. In some examples, the model includes hundreds of thousands of parameters, for example, at least two-hundred thousand, at least three-hundred thousand, or at least four-hundred thousand parameters.

In various implementations, a first process (P100, FIG. 5) includes providing inputs 310 to the RNC system 300 (FIG. 1, FIG. 2), e.g., to provide a driver (transducer) signal 122 for output to the transducer 130 to mitigate (or at least partially cancel) noise detectable by the user. In particular examples, as illustrated in FIGS. 3 and 4, the ML module 400 can be used to generate one or more of the following outputs to the RNC system 300 (e.g., the cancelation module 120 and/or adaptive module 150): i) estimated ear microphone signals 340 and/or projection filters 342.

As noted herein, in particular cases, one or more inputs 310 are provided to the ML module 400 during a training mode. In certain implementations, inputs 310 include one or more inputs 320 from a controller area network (CAN) bus 330. Various non-limiting inputs 320 are illustrated in FIGS. 3 and 4 merely as examples of potential inputs from the CAN bus 330. In certain cases, the inputs 320 from the CAN bus 330 include at least one vehicle input including: revolutions per minute (RPM) of the drive system, speed, torque, throttle, braking, positioning (e.g., global positioning system, GPS), steering angle, temperature (e.g., vehicle cabin temperature, drive system temperature, and/or ambient temperature), pressure (e.g., ambient pressure and/or tire pressure), seat position (e.g., as detected by a seat controller or cabin sensor(s)), user position, and/or seat occupancy (e.g., whether a seat is occupied as detected by one or more sensors in the cabin).

In addition to inputs 320 from the CAN bus 330, inputs 310 to the ML module 400 during training can include input(s) 350 from cabin microphones (e.g., microphone 240, FIG. 2) in the vehicle, inputs 360 from the transducer 130, and inputs 370 from an accelerometer 380 (e.g., located in any sensor configuration in the cabin or on the vehicle). Additionally, in the training mode, inputs 390 are provided from a set microphones 140 on the ear(s) 244 of the user in the vehicle (FIG. 1). In various implementations, the ear-mounted microphones 140 are located proximate an ear canal entrance of the user, e.g., inside the ear canal entrance, or outside the ear canal entrance near the pinna. In particular implementations, as noted herein, the ear-mounted microphones 140 only provide inputs to the ML module 400 during the training mode (FIG. 3). In particular aspects, the inputs 390 from the ear-mounted microphones 140 on the user approximate detected road noise by the user. In particular examples, the inputs 390 from the ear-mounted microphones 140 represent road noise as detected by the user at each ear 244.

Figure 6:
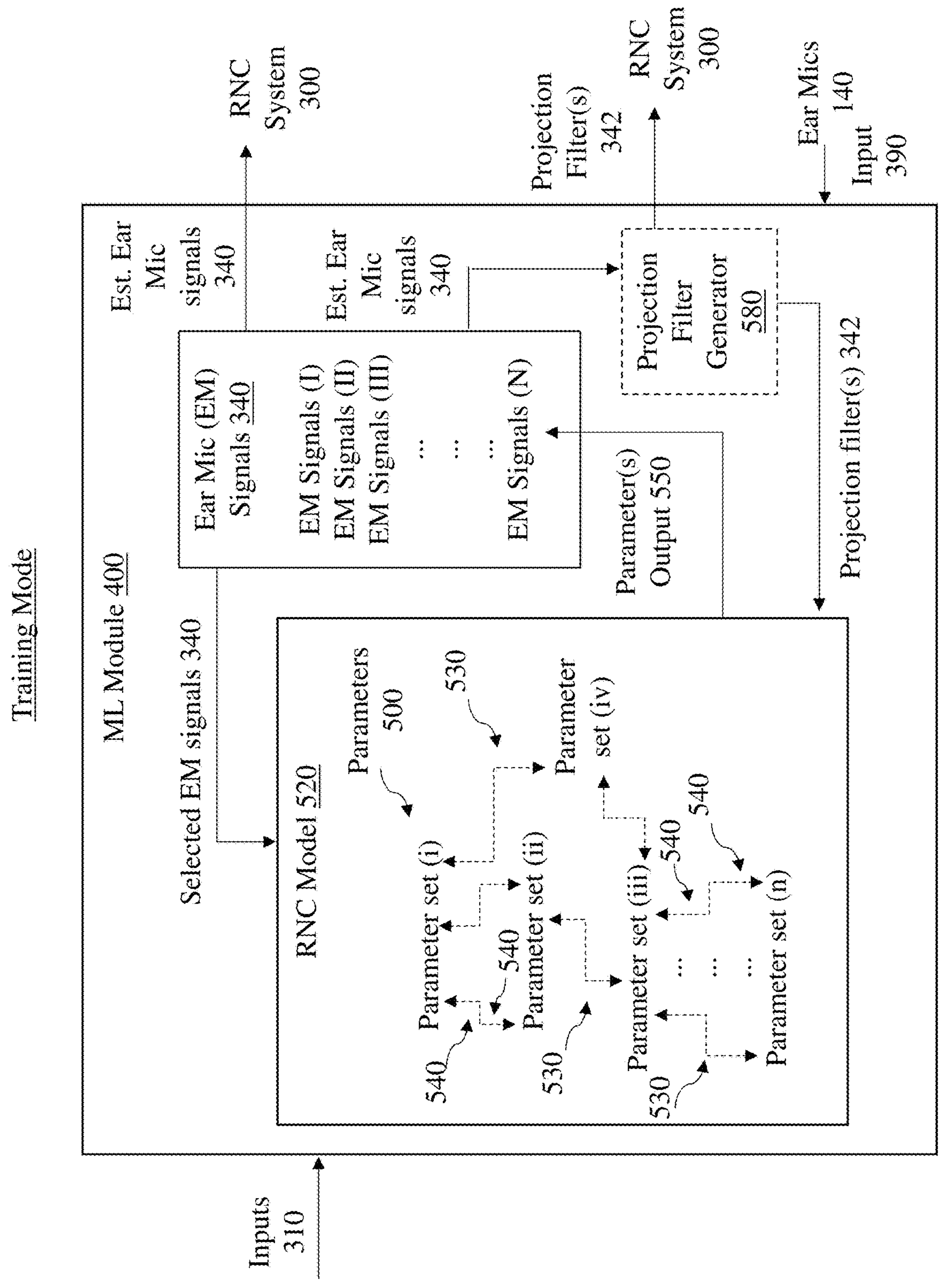
FIG. 6 is a data flow diagram illustrating the architecture of an RNC system, during a training mode, according to various implementations.

In another process (P110) illustrated in FIG. 5, the RNC system 300 (which can include the ML module 400) adapts a set of parameters 500 defining estimated ear microphone signals 340 based on the inputs 310. FIG. 6 shows a data flow diagram illustrating features of the ML module 400 including sets of parameters 500 and estimated ear microphone signals 340. In certain cases, the ML module 400 includes a projection filter generator 580 that is configured to convert estimated ear microphone signals 340 (along with inputs 310 and inputs 390 from ear mics 140) into projection filters for use in the RNC system (e.g., in the filter 120 and/or adaptation module 150). In other cases, projection filters can be generated by one or more of the filter 120 and/or module 150 based on the estimated ear microphone signals 340.

In particular implementations, the ML module 400 includes an artificial intelligence engine that includes one or more neural network layers. In one example, the neural network layers(s) include a deeply connected layer, convolutional layer, a recurrent layer, a long short term memory layer, a nonlinear activation layer, a normalization layer, etc.

In particular cases, the ML module 400 includes a model (e.g., a RNC model) 520 with a set of non-linear pathways 530 defined as sequences of steps 540 between distinct sets (i), (ii), (iii), . . . (n) of parameters 500. While one model 520 is illustrated, it is understood that the ML module 400 can include a plurality of models 520 for filtering detected road noise.

In various implementations, during training, the model 520 is configured to assign a road noise (or other unwanted noise) component to the input (signals) 390 received from the ear microphones 140. In particular implementations, the model 520 is configured to define and/or adjust correlations (e.g., pathways 530) between additional inputs 310 and road noise detected in the input 390. For example, the model 520 can be configured to define correlations such as pathways 530 between low frequency noise (e.g., below 100 Hertz (Hz)) detected in the input 390 and inputs 320 from the CAN bus 330 and/or inputs 370 from the accelerometer 380. In a particular example, the model 520 is configured to define correlations (e.g., pathways 530) between RPMs, speed, and/or torque indicated by inputs 320 from the CAN bus 330, and/or significant changes in acceleration (e.g., as indicated by accelerometer input 370), with low frequency noise detected in input 390 at the ear mics 140. In a particular example, the ML module 400 is configured to filter the input 390 to separate frequency ranges and/or acoustic signatures of the noise detected by ear mics 140, for example, to aid in identifying pathways 530 between noise characteristics and the additional inputs 310. In this particular example, the ML module 400 identifies signals indicative of road noise in the input 390, e.g., as low frequency acoustic signals, repetitive or recurring acoustic signals, temporary acoustic signals, and correlates those signals with inputs 310 that are attributed to road noise. In certain cases, the inputs 310 are predefined as being correlated with road noise, e.g., RPM, speed, torque, braking, steering angle (in CAN bus inputs 320) or accelerometer inputs 370. In these cases, the ML module 400 can define pathways 530 between parameters 500 such as low frequency signal inputs and/or acoustic signatures in inputs 390 and parameters 500 such as RPM or accelerometer thresholds, speed ranges, engagement of the braking system, or steering angle threshold from inputs 310. In certain cases, these pathways 530 are generally defined between parameters (or sets of parameters) based on predefined correlations. In other cases, these pathways 530 are defined or otherwise modified during training, e.g., where the model 520 determines a correlation between inputs 310, and inputs 390 from the ear microphones 140. In such cases, the RNC model 520 is refined during training to establish new pathways 530, modify existing pathways 530, or remove pathways 530 between sets of parameters 500 based on the inputs 390 from the ear microphones 140 and additional inputs 310 from the system.

Figure 7:
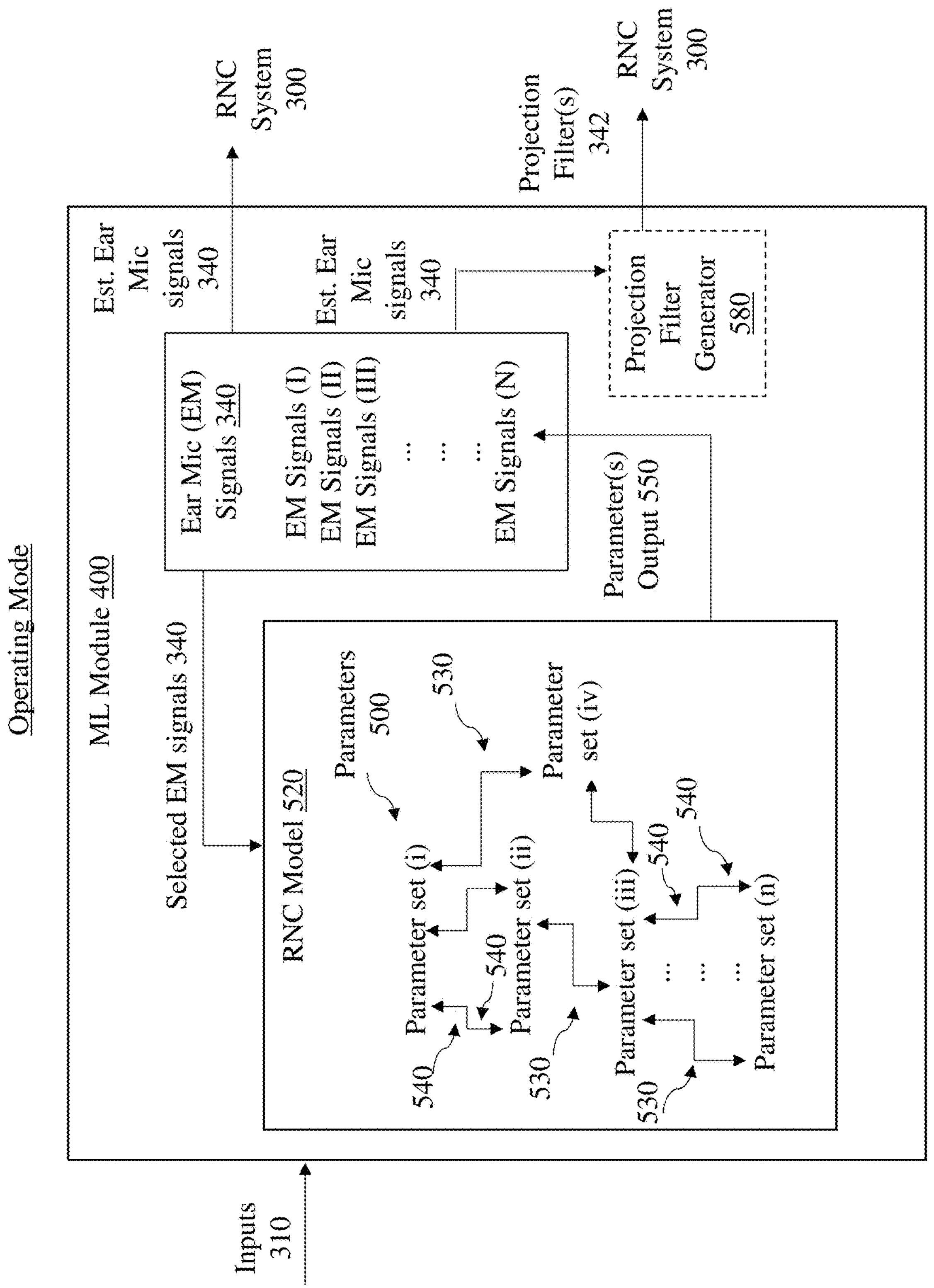
FIG. 7 is a data flow diagram illustrating the architecture of an RNC system, during an operational mode, according to various implementations.

Returning to the ML module 400 illustrated schematically in FIG. 6, steps 540 between the distinct sets of parameters 500 are alterable during the training mode. In some examples, the RNC model 520 includes hundreds of thousands of parameters 500, for example, at least two-hundred thousand, at least three-hundred thousand, or at least four-hundred thousand parameters 500. In particular cases, the sets of parameters 500 (including pathways 530) are alterable during the training mode (as indicated by dashed lines), and fixed during operational mode (after training, as indicated by solid lines), e.g., as illustrated in FIG. 7. It is understood that the training can be performed multiple times, such that the sets of parameters 500 and associated pathways 530 can be altered after operating the ML module 400.

In certain implementations, as noted herein, the RNC model 520 selects output parameters 550 for defining estimated ear microphone signals 340. The estimated ear microphone signals 340 can include distinct sets (I), (II), (III), . . . (N) of ear microphone signal characteristics that define attributes of the signals detected at the ear of the user based on ear microphone signal inputs 390 and additional inputs 310, e.g., such as filters defining one or more of frequency, energy (e.g., sound pressure level), band (or range), etc.

Returning to FIG. 5, in a further process (P120), the RNC system 300 (which can include the ML module 400) generates the estimated ear microphone signals 340 for output to the filter 120 and/or adaptive module 150 (FIGS. 1 and 2) based on the adapted set of parameters 500. In certain optional implementations (shown in FIGS. 6 and 7), the projection filters 342 are also generated from the estimated ear microphone signals 340, e.g., using a projection filter generator 580. As noted herein, where available, the projection filter generator 580 can use inputs 310 and/or inputs 390 from ear mics 140 in addition to estimated ear microphone signals 340 to generate projection filter(s) 342. In certain cases, projection filters 342 are generated according to one or more approaches described in U.S. Pat. No. 10,629,183 and/or U.S. patent application Ser. No. 17/611,280 (US PGPUB 2022/0208168), each previously incorporated by reference herein. For example, the projection filter generator 580 can include a set of relationships that map user ear positions to microphone and transducer 130 locations in the cabin, and based on the estimated ear signals 340, project the microphone signal received at one or more microphones 240. In particular cases, the set of projection filters includes a matrix of projection filters estimating a relationship between at least two of: a plurality of positions of the user's respective ears 244, a position of the at least one transducer 130, and a position of the set of microphones 240 in the cabin. In particular cases, the set of projection filters 342 are defined at least in part based on the inputs obtained from the set of ear-mounted microphones 244.

As described herein, in some implementations the estimated ear microphone signals 340 and/or the projection filters 342 are provided to the RNC system 300 during training mode (FIG. 1) and/or during operational (or, "inference") mode (FIG. 2) for canceling road noise detectable at the user's ear 244. In particular cases, the estimated ear microphone signals 340 and/or the projection filters 342 are provided to the cancelation module 120, e.g., to produce an aggregate cancelation signal 122 for the transducer 130. In additional cases, the estimated ear microphone signals 340 and/or the projection filters 342 are provided to the adaptation module 150 to aid in adaptation of the cancelation module 120. In further implementations, the estimated ear microphone signals 340 and/or the projection filters 342 are otherwise combined with the cancelation signal 122 to control cancelation output at the transducer 130.

In certain additional implementations (e.g., during training) an additional, optional process P130 can include adjusting fixed parameters in an adaptive module (e.g., adaptation module 150) of the RNC system 300 based on the estimated ear microphone signals 340. In such cases, the estimated ear microphone signals 340 are correlated with adaptive parameters (e.g., linear adaptive or other adaptive parameters) in the adaptation module 150, and such parameters are adjusted based on deviations between the estimated ear microphone signals 340 and the ear microphone signal values or ranges in the adaptation module 150.

In some examples, the transducer 130 is a near field (NF) transducer, which can be located within approximately 30 centimeters (cm) to approximately 90 cm of the user's ear 244. In some cases, the transducer 130 is a NF transducer located within approximately 50 cm of the user's ear 244, and in further cases, within approximately 30 cm of the user's ear 244. However, one or more transducer(s) 130 can be located outside of the near field (e.g., farther than 70 cm, 80 cm, 90 cm) relative to the user's ear(s) 244 and configured to aid in mitigating detectable road noise.

In additional optional implementations, during the training process (FIG. 5), the ML module 400 is configured to be updated (in process P140) based on the generated estimated ear microphone signals 340 and/or the projection filters 342. In such cases, the estimated ear microphone signals 340 and/or the projection filters 342 are fed back into the RNC model 520 to update the parameters 500 and/or pathways 530 (indicated in phantom as optional). In some cases, process P140 can be performed in real time in the ML module 400, e.g., based on the generated estimated ear microphone signals 340 and/or projection filters 342. In other cases, the ML module 400 can also be considered fixed, but will produce updated ear microphone signals 340 and/or projection filters 342 based on the inputs to the ML module 400. In various of these cases, RNC filters in the cancelation module 120 are updated in real time.

As noted herein, steps 540 (along pathways 530) between parameters 500 can be fixed during operational mode of the ML module 400. In other terms, during training, a common acoustic event (e.g., the sound from hitting the same pothole, in the same vehicle, at the same speed and angle, with the same ambient and vehicle conditions, e.g., inputs 310) can result in distinct estimated ear microphone signals 340 and/or the projection filters 342 for output based on changes in parameters 500. In such cases, during training, each parameter 500 is updated at every step 540 based on the inputs 310. In a particular example, updating each parameter 500 is based on a derivative of an error detected for each parameter 500. In contrast, during operating mode (FIGS. 7 and 8), the parameters 500 and pathways 530 are fixed, and as such, estimated ear microphone signals 340 and/or the projection filters 342 are deterministic of input signals (e.g., inputs 310). In such cases, a common acoustic event (e.g., the sound from hitting the same pothole, in the same vehicle, at the same speed and angle, with the same ambient and vehicle conditions, e.g., inputs 310) will result in the same estimated ear microphone signals 340 and/or the projection filters 342 for output based on the fixed set of parameters 500.

As noted herein, FIG. 7 shows a data flow diagram of the ML module 400 during an operating (or operational) mode. FIG. 8 is a flow diagram illustrating processes in a method of operating the RNC system 300 (FIG. 2), including the ML module 400, e.g., while operating a vehicle. The primary distinction between the operating mode (FIGS. 7 and 8) and the training mode (FIGS. 5 and 6) is that inputs 390 from ear microphones 140 are not provided to the ML module 400 during the operating mode. In these cases, processes can include:

P600: providing inputs 310 to the RNC system 300. This process can be substantially similar to P100 (FIG. 5), except that inputs 310 during operation do not include inputs 390 from ear microphones 140. In certain cases, the inputs 310 are provided strictly to the RNC system 300 because the ML module 400 is offline during operational mode of the RNC system 300. In other cases, the ML module 400 runs during operation of the RNC system 300 but is not updated during that operational period. In still further implementations, a portion or version of the ML module 400 is available to the RNC system 300 during operation but that portion or version is not updated or otherwise configured to adjust based on feedback from the RNC system 300.

P610: the RNC system 300, such as at the cancelation module 120 and/or the adaptation module 150 applies a set of parameters defining an estimated signal detected at the user's ears 244 based on inputs such as the estimated ear microphone signals 340 and/or the projection filters 342. In certain cases, parameters defining the estimated signal are fixed in the RNC system 300, e.g., in the adaptation module 150. The selected parameters are based on inputs 310 from one or more sensors or CAN bus inputs, as well as the estimated ear microphone signals 340 and/or the projection filters 342 from the ML module 400. In this case, the parameters are applied based on the inputs 310 in a fixed manner, e.g., a common acoustic event will result in the same applied parameters and associated NC signals 122 (FIG. 2).

P620: the RNC system 300, e.g., the cancelation module 120, generates the NC signals 120 for output to the transducer 130 based on the applied set of parameters, e.g., in a similar manner as described in adaptive filtering in U.S. Pat. No. 10,629,183 and/or U.S. patent application Ser. No. 17/611,280 (US PGPUB 2022/0208168), each previously incorporated by reference herein.

As noted herein, various implementations enable effective and responsive noise cancelation in an audio system (e.g., systems 100, 200) using a trained ML module 400. These implementations can beneficially relate various vehicle operating parameters as well as other detectable parameters to detected noise signals (e.g., from a user-worn microphones 140), and incorporate those relationships into an RNC model (e.g., RNC model 520) that can provide inputs for use, e.g., during vehicle operation.

While examples herein have been described in regards to cancelation or reduction of road noise, certain additional examples can include cancelation or reduction of harmonics of rotating equipment or other modification of harmonic acoustic signals. In such examples, the cancelation filter as described herein may be an enhancement filter configured and adapted to provide an enhancement signal that causes the transducer to provide an enhancement audio signal to modify the sound of one or more harmonics at the occupant's ear. The feedback sensor (remote microphone) may be "projected" to the occupant's ear location in similar manner to those example systems and methods described above. Accordingly, in such examples, one or more of a projection filter and/or a correction filter may be applied in similar manner to the examples described herein to provide an estimated signal representative of the sound at the occupant's ear and may adapt the enhancement filter (the otherwise cancelation filter) to achieve a target sound of the one or more noise sources.

In various examples, enhancement, reduction, or cancelation may be performed for multiple occupant locations. For example, remote microphones 240 may be included to detect acoustic energy at more than one location and multiple projection and correction filters may be stored for multiple occupant ear locations. In such examples, enhancement, reduction, or cancelation may be performed for selected occupant locations dependent upon actual occupancy and/or user selection. For instance, a rear seat occupant may be detected and example systems herein may operate to reduce noise at the ears of the rear occupant while also reducing noise at an operator's ears (e.g., in the driver's seat). However, the system may de-activate noise reduction at the rear occupant's ear location when it is detected that there is no rear occupant and/or based upon user selection to disable noise reduction in the rear seat location. De-activation of noise reduction at one or more locations may enable better performance of noise reduction at other locations, as such a system may minimize acoustic noise content at fewer locations.

While examples herein have been described with respect to a vehicular environment, the example systems, methods, and program code may be beneficially applied to cancelation, enhancement, or other modification of acoustic signals in other environments, such as industrial, manufacturing, factory, electric production, or other environments that may involve rotating equipment that may produce undesired acoustic noise.

While this disclosure provides an architecture for providing noise cancelation in a vehicle, an exhaustive description of systems such as vehicle audio systems that can employ these approaches is omitted for brevity purposes. To the extent necessary, illustrative vehicle audio systems are for example described in U.S. Pat. No. 9,913,065 (issued to Bose Corporation on Mar. 6, 2018), U.S. Pat. No. 9,967,692 (issued to Bose Corporation on May 8, 2018), and U.S. Pat. No. 10,056,068 (issued to Bose Corporation on Aug. 21, 2018), the entire contents of each of which are hereby incorporated by reference. Further, various aspects of the disclosure provide an architecture for mitigating road noise detected by users in a seat. Examples of systems for detecting user movement in a seat are described in U.S. patent application Ser. No. 17/986,007 (filed Nov. 14, 2022), U.S. patent application Ser. No. 17/837,482 (filed Jun. 10, 2022), and U.S. Pat. No. 11,376,991 (Ser. No. 16/916,308, filed Jun. 30, 2020 and issued on Jul. 5, 2022), the entire contents of each of which are hereby incorporated by reference.

Certain examples are described as relating to mitigating noise (e.g., road noise) in a space. In particular cases, the space includes the cabin of a vehicle such as a passenger vehicle (e.g., sedan, sport utility vehicle, pickup truck, etc.), a public transit vehicle such as a train, bus or ferry boat, an airplane, a ride-sharing vehicle, etc. Certain example implementations benefit from usage in a vehicle having a number of seating locations, e.g., two or more seating locations in a passenger vehicle or public transit vehicle. However, as noted herein, various implementations provide benefits to a single user and/or a single seating location.

In certain cases, one or more microphones (e.g., an array of microphones) is positioned proximate a speaker 130 (e.g., a NF speaker) e.g., to enable detection of acoustic signals in the user's near field. In particular cases, microphones positioned proximate the NF speaker(s) can be separately housed from the NF speaker(s). In other cases, microphones can be collectively housed with the NF speaker(s). In various implementations, microphones positioned proximate (e.g., within several centimeters up to approximately ten centimeters) the NF speaker can provide feedback and/or feedforward functions in a noise cancelation system and/or spatialization system described herein. In certain optional cases, the system can include further speakers 130, such as wall-mounted, cab-mounted or door-mounted speakers. In particular cases, additional speakers are outside of the near-field range relative to a first user in a seat. In particular cases, the additional speakers are approximately 100 cm or more from the user's ears while in the seat.

As noted herein, the ML module 400 is configured to deploy a set of filters to mitigate detected noise in the space (e.g., vehicle. In certain implementations, the set of filters are: i) predetermined, ii) fully adaptive, or iii) a mixture of predetermined and fully adaptive. In some examples, a fully adaptive filter relies on the use of the sensors such as microphones (e.g., microphones such as microphones 140, 240 and/or proximate NF speakers) as an error microphone and/or a predictive model or simulation of the environment in the space to filter the audio signals. Additional details of adaptive filters in digital signal processing are included in U.S. Pat. No. 9,633,647 (Self-Tuning Transfer Function for Adaptive Filtering) filed Oct. 4, 2016, which is entirely incorporated by reference herein.

In various implementations, the ML module 400 can deploy a set of filters to audio signal inputs to reduce noise detected by one or more sensors (e.g., microphones 140, 240). In certain aspects, the ML module 400 deploys distinct filters (e.g., specific filters and/or sub-sets of filters) to provide at least one of: i) seat-specific noise cancelation settings for the audio output, ii) user-specific noise cancelation settings for the audio output, iii) user-adjustable noise cancelation settings for the audio output, or iv) differential user-adjustable noise cancelation settings for the audio output. In still further examples, the controller includes noise cancelation settings that are user-adjustable, e.g., via an interface at the vehicle control system or via an application running on a connected additional device such as a smart device.

In some aspects, such as where the system 100, 200 is part of a vehicle, noise cancelation (NC) settings can be tailored to cancel road noise and/or engine noise, tire cavity and/or cabin boom noise. Further description of NC settings and noise control in vehicles is described in U.S. Pat. No. 10,839,786 (Systems and Methods for Canceling Road Noise in a Microphone Signal), filed Jun. 17, 2019, and U.S. Pat. No. 9,928,823 (Adaptive Transducer Calibration for Fixed Feedforward Noise Attenuation Systems), filed Aug. 12, 2016, each of which is entirely incorporated by reference herein.

Particular implementations are described as including an ML module 400 that is configured to control audio output in mitigating noise detected by the user with speakers 130 such as NF speakers or other mid-field or far-field speakers. In the example where system 100, 200 is part of a vehicle, the ML module 400 can be configured to adjust NC settings to cancel or otherwise mitigate vehicle noise. In particular cases, adjusting NC settings can include applying a narrowband feedforward or feedback control to a noise signal at the speakers (e.g., speakers 130) based on input(s) from one or more reference sensors (e.g., inputs 310, 320, 390). In some cases, the input from the reference sensor indicates an RPM level of the vehicle or a target frequency of noise in the space (e.g., where space includes a vehicle cabin), for example, as indicated by an input from sensors and/or additional microphones in the system 100, 200. In certain cases, the reference sensor can include a microphone, an accelerometer (e.g., an IMU) or a strain sensor. In some additional aspects, adjusting the NC setting includes applying a broadband feedforward control to a noise signal at a NF speaker based on an input from a reference sensor in the space. The reference sensor for the feedforward control can include one or more of the same reference sensors used in the narrowband NC setting adjustment, or can include distinct reference sensors. Examples of narrowband noise include engine and/or motor harmonics, noise from detection systems such as LiDAR motor(s), tire cavity resonance, cabin boom noise and/or compressor (e.g., air conditioning compressor) noise. Examples of broadband noise that the system is capable of controlling (and in some cases canceling) include road noise such as structure-borne road noise. In particular examples, tire cavity resonance and cabin boom are tonal subsets of broadband noise, even though generally classified as narrowband noise. In certain implementations, one or more portions of the system 100, 200 are configured to focus noise cancelation on narrowband noise, enhancing cancelation within the relatively narrower band of noise (as compared with broadband cancelation).

In any case, the approaches described according to various implementations have the technical effect of enhancing noise cancelation, in particular, road noise cancelation, in a space such as a vehicle. For example, a road noise cancelation (RNC) system according to various implementations can include a machine-learning (ML) component configured to function in a training mode and an operation (or operational) mode. In the training mode, inputs from ear-mounted microphones are provided to the ML based RNC system to aid in adapting a set of parameters that define noise cancelation signals. In particular cases, the ear-mounted microphone inputs are only used during the training mode. In particular cases, the ML based RNC system is configured to be updated based on generated road noise cancelation signals. The ML based RNC system can effectively map (or, relate) noise signals detected by the user during the training with output signals from a transducer, and over time, embed those mappings (or relationships) for use during operation. As compared with conventional systems and approaches, the disclosed ML based RNC system improves noise control for the user, enhancing the overall experience.

Machine learning models described herein may for example be implemented in software, hardware, or a combination thereof. Machine learning models described herein may include a deep neural network (DNN), which is a type of artificial neural network that is composed of multiple layers of interconnected nodes or artificial neurons. A DNN may for example include convolution neural networks (CNN) designed to work with multi-dimensional grid-like data (e.g., a spectrogram), recurrent neural networks (RNNs) or variants like Long Short-Term Memory (LSTM), which can be combined with CNNs.

DNNs generally include an Input Layer that receives the raw data or features. Each neuron in this layer corresponds to an input feature. For example, in image recognition, each neuron might represent a pixel's intensity value. DNNs further include a Weighted Sum and Activation Function in which each connection between neurons in adjacent layers has an associated weight. The input data is multiplied by these weights, and the results are summed up for each neuron in the next layer. An activation function is applied to this weighted sum to introduce non-linearity and make the network capable of learning complex relationships. Common activation functions include ReLU (Rectified Linear Unit), Sigmoid, and Tanh. Between the input and output layers there can be one or more Hidden Layers. These layers contain neurons that learn progressively more abstract and complex features from the input data. Each neuron in a hidden layer receives inputs from all neurons in the previous layer, applies the weighted sum and activation function, and passes the result to the next layer. The last layer in the DNN is the Output Layer, which produces the final result of the network's computation. The number of neurons in the output layer depends on the specific task. For instance, in binary classification, there might be one neuron for each class, whereas in multi-class classification, there may be multiple neurons per class.

The DNN is trained for example using supervised learning, e.g., by repeatedly presenting training data to the network, calculating the loss, and updating the weights using backpropagation and optimization algorithms. This process continues until the model converges to a satisfactory level of performance. The process may include use of a loss function that measures the difference between the predicted output and the actual target. Common loss functions include mean squared error for regression tasks and categorical cross-entropy for classification tasks. Optimization algorithms adjust the weights in the network to minimize the loss function iteratively. Gradient descent, stochastic gradient descent (SGD), and Adam, may for example be utilized.

Training for supervised learning may utilize a dataset that includes input data (features) and corresponding target outputs (labels). Once trained, the DNN can be used for inference on new, unseen data. The input data is passed through the network, and the output provides predictions or classifications based on what the network has learned during training. The DNN may be periodically evaluated on a separate validation dataset to monitor how well it generalizes to unseen data. This helps prevent overfitting, where the model becomes too specialized on the training data.

Various wireless connection scenarios are described herein. It is understood that any number of wireless connection and/or communication protocols can be used to couple devices in a space. Examples of wireless connection scenarios and triggers for connecting wireless devices are described in further detail in U.S. patent application Ser. No. 17/714,253 (filed on Apr. 4, 2022) and U.S. Ser. No. 17/314,270 (filed on May 7, 2021), each of which is hereby incorporated by reference in its entirety).

The above description provides embodiments that are compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the spatialized audio output control aspects according to the approaches described above.

It is understood that the relative proportions, sizes and shapes of the system and components and features thereof as shown in the FIGURES included herein can be merely illustrative of such physical attributes of these components. That is, these proportions, shapes and sizes can be modified according to various implementations to fit a variety of products. For example, while a substantially block (or rectangular cross-sectional) shaped loudspeaker may be shown according to particular implementations, it is understood that the loudspeaker could also take on other three-dimensional shapes in order to provide acoustic functions described herein.

The term "approximately" as used with respect to values herein can allot for a nominal variation from absolute values, e.g., of several percent or less. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Though the elements of several views of the drawings herein may be shown and described as discrete elements in a block diagram and may be referred to as "circuitry," unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines, as a single discrete digital signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or digital signal processing techniques and are included within the scope of this patent application. Unless otherwise indicated, audio signals may be encoded in either digital or analog form; conventional digital-to-analog or analog-to-digital converters may not be shown in the figures.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A method of training a road noise cancelation (RNC) system for a vehicle, the method comprising:

providing inputs to RNC system, the inputs obtained from: a set of ear-mounted microphones on a user of the vehicle, at least one transducer, an accelerometer, a set of cabin microphones in the vehicle, and a controller area network (CAN) bus, wherein the inputs from the set of ear-mounted microphones on the user approximate a signal detected by the ears of the user;

adapting a set of parameters in the RNC system defining an estimated signal detected at respective ears of the user based on the inputs; and generating at least one of the following for input during an operating mode of the RNC system:

estimated ear microphone signals based on the adapted set of parameters, or a set of projection filters for use in determining an estimated ear signal at the respective ears of the user.

2. The method of claim 1, wherein the ear-mounted microphones only provide inputs during the training.

3. The method of claim 1, wherein the ear-mounted microphones are located proximate an ear canal entrance of the user, wherein the inputs from the set of ear-mounted microphones on the user represent at least one of: road noise as detected by the user at each ear, or a cancelation signal output by the at least one transducer.

4. The method of claim 1, wherein the at least one transducer is a near-field (NF) transducer proximate the user.

5. The method of claim 1, wherein the set of projection filters includes a matrix of projection filters estimating a relationship between at least two of: a plurality of positions of the user's respective ears, a position of the at least one transducer, and a position of the set of microphones in the vehicle cabin, and wherein the set of projection filters are defined at least in part based on the inputs obtained from the set of ear-mounted microphones.

6. The method of claim 1, further comprising adjusting fixed parameters in a linear adaptive module of the RNC system based on the estimated ear microphone signals.

7. The method of claim 1, wherein the inputs from the CAN bus include at least one vehicle input including: revolutions per minute (RPM) of the drive system, speed, torque, throttle, braking, positioning, steering angle, temperature, pressure, seat position, user position, or seat occupancy.

8. The method of claim 1, further comprising updating the RNC system based on the generated estimated ear microphone signals and/or the set of projection filters during the training.

9. The method of claim 1, wherein the RNC system includes a machine-learning (ML) module with a set of non-linear pathways defined as sequences of steps between distinct sets of parameters, and wherein steps between the distinct sets of parameters are alterable during the training, wherein a common acoustic event results in distinct noise cancelation signals for output based on changes in parameters during the training, wherein during the training, each parameter is updated at every step based on the inputs, wherein updating of each parameter is based on a derivative of an error detected for each parameter, and wherein after the training, the steps between the distinct sets of parameters are fixed.

10. A method of running a road noise cancelation (RNC) system for a vehicle, the method comprising:

providing inputs to the RNC system, the inputs obtained from: at least one transducer, an accelerometer, a set of cabin microphones in the vehicle, and a controller area network (CAN) bus, applying a set of parameters in the RNC system defining an estimated signal detected at respective ears of a user based on the inputs, wherein the set of parameters are applied based on at least one of:

estimated ear microphone signals, or a set of projection filters for use in determining an estimated ear signal at the respective ears of the user; and generating noise cancelation signals for output by the at least one transducer based on the applied set of parameters, wherein a portion of the RNC system is trained prior to running with additional inputs from ear-mounted microphones worn by the user, wherein the ear-mounted microphones are located proximate an ear canal entrance of the user, and wherein the inputs from the set of ear-mounted microphones on the user represent at least one of: road noise as detected by the user at each ear, or a cancelation signal output by the at least one transducer.

11. The method of claim 10, wherein the at least one transducer is a near-field (NF) transducer proximate the user of the vehicle.

12. The method of claim 10, wherein the set of projection filters includes a matrix of projection filters estimating a relationship between at least two of: a plurality of positions of the user's respective ears, a position of the at least one transducer, and a position of the set of cabin microphones in the vehicle, wherein the set of projection filters are defined at least in part based on inputs obtained from a set of ear-mounted microphones during training of the portion of the RNC system.

13. The method of claim 10, further comprising adjusting fixed parameters in the RNC system based on the estimated ear microphone signals.

14. The method of claim 10, wherein the inputs from the CAN bus include at least one vehicle input including:

revolutions per minute (RPM) of the drive system, speed, torque, throttle, braking, positioning, steering angle, temperature, pressure, seat position, user position, or seat occupancy.

15. The method of claim 10, wherein the RNC system includes a machine-learning (ML) module with a set of non-linear pathways defined as sequences of steps between distinct sets of parameters, and wherein steps between the distinct sets of parameters are fixed during operation, wherein the RNC system is configured to run in a plurality of modes including a training mode and an operational mode, and wherein in the training mode the ML module is trained using inputs from user-worn input microphones that approximate road noise detected by a user's ears, wherein the training mode is configured to be run at least one of before or after the operation mode, and wherein the RNC system has at least one distinction in a set of parameters in the training mode as compared with the set of parameters in the operation mode.

16. A system comprising:

a vehicle audio system including at least one transducer for providing an audio output to a user in a vehicle;

a vehicle sensor system for obtaining sensor inputs about the vehicle; and a road noise cancelation (RNC) system connected with the vehicle audio system and the vehicle sensor system, the RNC system including a machine learning (ML) module and a linear adaptive (LA) module, wherein the ML module is configured to:

receive inputs from: the vehicle audio system and the vehicle sensor system;

applying a set of parameters defining an estimated signal detected at respective ears of the user based on the inputs, wherein the set of parameters are applied based on at least one of:

estimated ear microphone signals, or a set of projection filters for use in determining an estimated ear signal at the respective ears of the user, wherein the ML module is trained prior to running with inputs from ear-mounted microphones worn by the user, wherein the ear-mounted microphones are located proximate an ear canal entrance of the user, and wherein the inputs from the set of ear-mounted microphones on the user represent at least one of: road noise as detected by the user at each ear, or a cancelation signal output by the at least one transducer, and wherein the LA module is configured to:

generate noise cancelation signals for output by the at least one transducer based on the applied set of parameters.

17. The system of claim 16, wherein the inputs are received from the at least one transducer and the vehicle sensor system, the inputs from the vehicle sensor system including inputs from: an accelerometer, a set of microphones proximate a roof of the vehicle, and a controller area network (CAN) bus, and wherein the inputs from the CAN bus include at least one vehicle input including: revolutions per minute (RPM) of the drive system, speed, torque, throttle, braking, positioning, steering angle, temperature, pressure, seat position, user position, or seat occupancy.

18. The system of claim 17, wherein the at least one transducer is a near-field (NF) transducer proximate the user.

19. The system of claim 17, wherein the set of projection filters includes a matrix of projection filters estimating a relationship between at least two of: a plurality of positions of the user's respective ears, a position of the at least one transducer, and a position of a set of microphones located proximate a roof of the vehicle.

20. The system of claim 16, wherein the set of projection filters are defined at least in part based on inputs obtained from the set of ear-mounted microphones during training of the ML module.

21. The system of claim 16, further comprising adjusting fixed parameters in the LA module based on the estimated ear microphone signals.

22. The system of claim 16, wherein the ML module includes a model with a set of non-linear pathways defined as sequences of steps between distinct sets of parameters, and wherein steps between the distinct sets of parameters are fixed during operation.

23. The system of claim 16, wherein the RNC system is configured to run in a plurality of modes, wherein the plurality of modes includes a training mode and an operational mode, wherein in the training mode the ML module is trained using inputs from user-worn input microphones that approximate road noise detected by the user's ears, wherein the training mode is configured to be run at least one of before or after the operation mode, and wherein the ML module has at least one distinction in a set of parameters in the training mode as compared with the set of parameters in the operation mode.

* * * * *